United States Patent
Hellenbrand

(10) Patent No.: US 10,322,505 B2
(45) Date of Patent: Jun. 18, 2019

(54) CONTROLLER FOR A COMMISSIONING DEVICE

(71) Applicant: Becton Dickinson Rowa Germany GmbH, Kelberg (DE)

(72) Inventor: Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 0 days.

(21) Appl. No.: 15/654,971

(22) Filed: Jul. 20, 2017

(65) Prior Publication Data

US 2019/0022855 A1    Jan. 24, 2019

(51) Int. Cl.
| | | |
|---|---|---|
| *B25J 9/16* | (2006.01) |
| *B25J 9/04* | (2006.01) |
| *G05B 19/414* | (2006.01) |
| *B65G 13/10* | (2006.01) |
| B65G 47/68 | (2006.01) |
| B25J 17/02 | (2006.01) |
| B25J 9/10 | (2006.01) |

(52) U.S. Cl.
CPC .............. *B25J 9/1602* (2013.01); *B25J 9/04* (2013.01); *B65G 13/10* (2013.01); *G05B 19/4141* (2013.01); *B25J 9/1025* (2013.01); *B25J 17/02* (2013.01); *B65G 47/68* (2013.01); *G05B 2219/41116* (2013.01)

(58) Field of Classification Search
CPC .............................. B65G 1/0435; B65G 47/90
See application file for complete search history.

(56) References Cited

U.S. PATENT DOCUMENTS

| | | | | |
|---|---|---|---|---|
| 6,826,008 | B2 * | 11/2004 | Paulat ................ | G11B 15/6885 360/92.1 |
| 6,923,612 | B2 * | 8/2005 | Hansl ................... | B65G 1/0435 414/277 |

(Continued)

FOREIGN PATENT DOCUMENTS

| | | |
|---|---|---|
| EP | 2163507 A1 | 3/2010 |
| EP | 2165950 A1 | 3/2010 |

(Continued)

OTHER PUBLICATIONS

Extended European Search Report from European Patent Application No. 17182335.4, dated Jan. 29, 2018, 9 pages.

*Primary Examiner* — Kaitlin S Joerger
(74) *Attorney, Agent, or Firm* — Morgan, Lewis & Bockius LLP

(57) ABSTRACT

A controller for a commissioning device for storing piece goods such as medicinal packages is provided. The controller includes a delivery table that extends in a first direction, two elongated clamping jaws disposed above the delivery table, the jaws having clamping surfaces that face one another, and a clamping jaw guide apparatus with a frame structure, at least one first and one second guide which are separated from one another in the first direction and extend in a second direction, and at least four clamping jaw carriages which are coupled to the guides and driven in the second direction. Two clamping jaw carriages each are associated with a guide and at least two clamping jaw carriages separated from one another in the first direction are coupled to one clamping jaw, respectively.

17 Claims, 6 Drawing Sheets

(56) References Cited

U.S. PATENT DOCUMENTS

| | | | |
|---|---|---|---|
| 9,296,569 B2* | 3/2016 | Hellenbrand | B65G 1/0421 |
| 9,771,216 B2* | 9/2017 | Hellenbrand | B65G 1/0421 |
| 9,950,861 B2* | 4/2018 | Von Liechtenstein | ........................ |
| | | | B65G 1/0407 |
| 2009/0136331 A1* | 5/2009 | Muser | B65G 1/0407 |
| | | | 414/529 |
| 2011/0008138 A1* | 1/2011 | Yamashita | B65G 1/0435 |
| | | | 414/277 |
| 2016/0200513 A1* | 7/2016 | Hellenbrand | B65G 1/06 |
| | | | 414/280 |

FOREIGN PATENT DOCUMENTS

| | | |
|---|---|---|
| JP | H 10-181809 A | 7/1998 |
| JP | 2017-052612 A | 3/2017 |
| WO | WO-2016/110530 A1 | 7/2016 |

* cited by examiner

CONTROLLER FOR A COMMISSIONING DEVICE

BACKGROUND OF THE DISCLOSURE

The present disclosure relates to a controller for a commissioning device and in particular to a controller for a commissioning device with horizontal storage areas for storing piece goods, in particular medicinal packages.

Controllers for commissioning devices for automatically storing and retrieving piece goods, such as medicinal packages, are known. For example, a known controller may have a delivery table and clamping jaws disposed thereabove. The clamping jaws are pivotably attached to a top part of the controller. The top part includes a guide which is coupled to the clamping jaws. To execute a pivoting motion of the clamping jaws, the guide is moved in the storage and retrieval direction.

SUMMARY

One or more disclosed embodiments provide a controller for a commissioning device with horizontal storage surfaces for storing piece goods. Many controllers have numerous components which are necessary to execute the pivoting motion, which leads to high costs for the controller. Furthermore, the design of the guide and the translation of a rotational motion of a drive into the pivoting motion of the clamping jaws limit the jaws to exert only a limited clamping force onto piece goods to be retrieved. Medicinal packages are changing is size, and an increasing number of medicinal packages with larger dimensions and higher weights are appearing on the market such that increased clamping force has become desirable.

In some embodiments described herein, the controller includes a delivery table extending in a first horizontal direction, the delivery table having a storage end and a retrieval end, two elongated clamping jaws disposed above the delivery table and comprising clamping surfaces facing one another, and a clamping jaw guide apparatus. The clamping jaw guide apparatus includes a frame structure and at least one first and one second guide that are parallel and apart from one another in the first horizontal direction and extend in a second horizontal direction perpendicular to the first horizontal direction. The clamping jaw guide apparatus also includes at least four clamping jaw carriages coupled to the guides and driven in the second horizontal direction, wherein two first clamping jaw carriages are associated with the first guide and two second clamping jaw carriages are associated with the second guide, respectively, and wherein at least two clamping jaw carriages separated from one another in the first horizontal direction are coupled to a single clamping jaw, respectively. The controller further includes a guide apparatus drive unit coupled to the clamping jaw guide apparatus, the guide apparatus drive unit configured to drive the clamping jaw guide apparatus in the first horizontal direction.

One or more disclosed embodiments provide a controller having a delivery table, a plurality of elongated clamping jaws disposed above the delivery table, and a clamping jaw guide apparatus. The clamping jaw guide apparatus includes a frame structure, a plurality of guides disposed in parallel with the frame structure, and a plurality of clamping jaw carriages coupled to the plurality of guides, the plurality of clamping jaw carriages configured to be driven in parallel with the frame structure. Each of the plurality of guides is associated with one or more of the plurality of clamping jaw carriages and at least two of the plurality of clamping jaw carriages are coupled to each of the plurality of clamping jaws. The controller also includes a guide apparatus drive unit coupled to the clamping jaw guide apparatus, the drive unit configured to drive the clamping jaw guide apparatus along the delivery table. First clamping jaw carriages are associated with the first guide and second clamping jaw carriages are associated with the second guide. At least two of the plurality of clamping jaw carriages are coupled to one of the clamping jaws and are separated from one another in the first direction.

One or more disclosed embodiments provide a commissioning device controller having a delivery table elongated in a first direction, two clamping jaws disposed above the delivery table, a guide apparatus drive unit, and a clamping jaw guide apparatus coupled to the guide apparatus drive unit. The guide apparatus drive unit is configured to drive the clamping jaw guide apparatus in the first direction. The clamping jaw guide apparatus includes a frame structure, first and second guides disposed in parallel and apart from one another along the first direction, and extending in a second direction perpendicular to the first direction, and a plurality of clamping jaw carriages coupled to the first and second guides and configured to be moveable in the second direction.

BRIEF DESCRIPTION OF THE DRAWINGS

The device according to the present disclosure and the method according to the present disclosure are described in greater detail below, with reference to the appended drawings, wherein:

FIG. 1b is a bottom perspective view of the controller of FIG. 1a;

FIG. 2b is a bottom perspective view of the clamping jaw guide apparatus of FIG. 2a;

FIG. 3 is a perspective view of a portion of the clamping jaw guide apparatus of FIG. 2a;

DETAILED DESCRIPTION

Figure 1A:
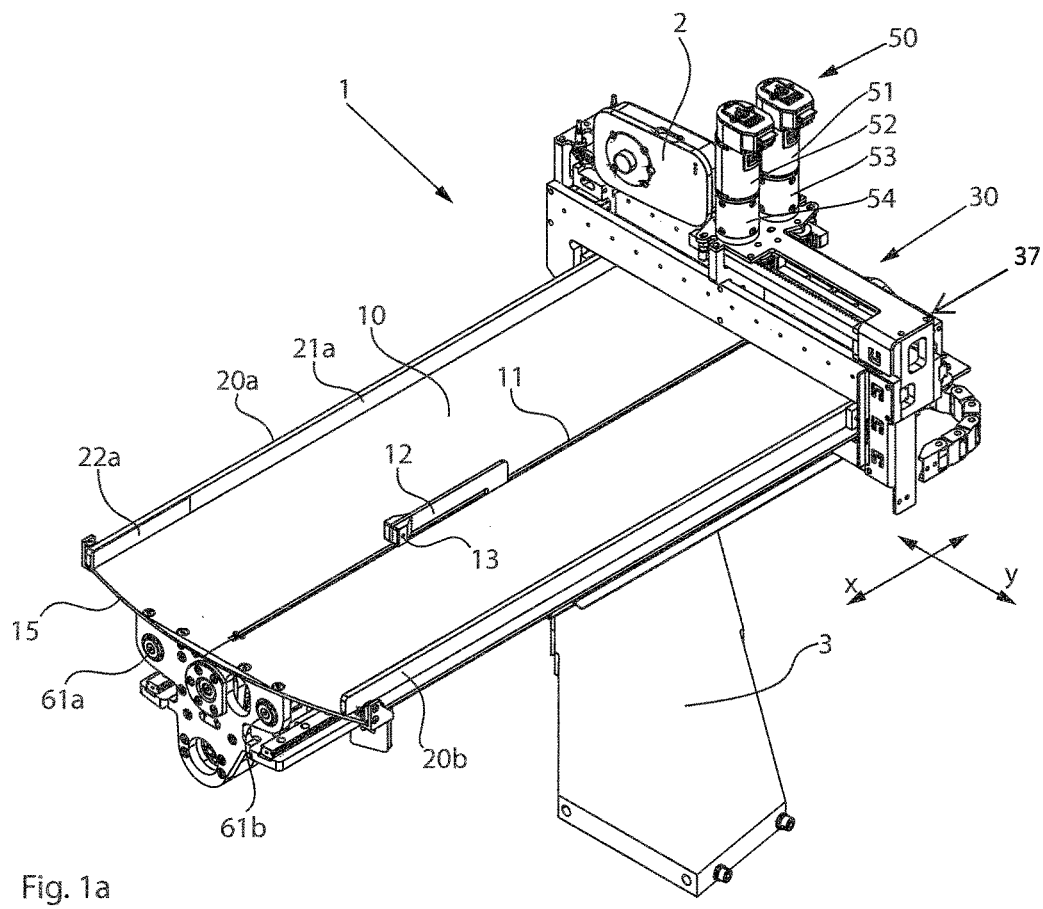
FIG. 1a is a top perspective view of an embodiment of a controller.

The present disclosure provides a controller of simplified design with pivotable clamping jaws for producing higher clamping forces.

In the scope of this application, the terms "piece good" and "medicinal package" will be used, wherein these terms will also be understood to include the respective plurals. The controller according to the disclosure may be used to store and retrieve a piece good or medicinal package, or a plurality of piece goods or medicinal packages simultaneously.

A controller for a commissioning device with horizontal storage areas for storing piece goods, in particular medicinal packages, may include a delivery table with a storage and retrieval side for moving piece goods or medicinal packages from or to a storage area, the table extending in a first horizontal direction (x). The above first horizontal direction corresponds to the storage and retrieval direction for piece goods and is normally identical to the longitudinal axis of the controller. Two elongated clamping jaws are disposed above the delivery table, the jaws having clamping surfaces facing one another.

The controller may further include a clamping jaw guide apparatus with a frame structure and at least one first and one second guide which are in parallel with one another separated at a distance in the first horizontal direction (x), extending in a second horizontal direction (y) perpendicular to the first horizontal direction (x). The second horizontal direction is thus perpendicular and orthogonal to the storage and retrieval direction.

The controller itself is disposed on the side of the delivery table opposite the storage and retrieval side thereof. The first guide is defined here as the guide facing the storage and retrieval side. The second guide is disposed parallel and behind the first guide relative to the storage and retrieval side.

The clamping jaw guide apparatus may further include at least four clamping jaw carriages which are coupled to the guides and driven in the second horizontal direction (y) and movable at the guides, wherein two first clamping jaw carriages are associated with the first guide and two second clamping jaw carriages are associated with the second guide, and wherein at least two clamping jaw carriages are coupled to a respective clamping jaw at a distance from one another in the first horizontal direction (x).

The controller may also include a drive unit for moving the clamping jaw guide unit in the first horizontal direction (x), the drive unit being coupled to the clamping jaw guide apparatus.

Therefore, each clamping jaw is coupled to a plurality of clamping jaw carriages, usually to half of the clamping jaw carriages present. The coupling points are offset relative to the first horizontal direction (x) (e.g., the storage and retrieval direction) so that, for example, the motion of the first clamping jaw carriages toward one another in the second horizontal direction (y) effects a tilting of the clamping jaws together when the second clamping jaw carriages are positionally fixed.

In the controller, the control of the clamping jaws is executed very simply and directly by way of the at least four clamping jaw carriages, and no movement of a guide unit in the storage or retrieval direction is required to pivot the tilting jaws opposite to this storage and retrieval direction. Through this direct control using at least two clamping jaw carriages per clamping jaw, higher clamping forces may be applied. For example, the controller may have the at least two clamping jaw carriages per clamping jaw act in concert (e.g., by moving the two clamping jaw carriages toward one another relative to the second horizontal direction (y)). Seen from a design perspective, the controller according to the disclosure is much simpler, and higher clamping forces may be applied despite this simpler design.

In order to move the clamping jaw carriages in the second horizontal direction (y) at the guides, each clamping jaw carriage may be provided with a dedicated drive unit, for example, the drive unit sitting directly on the clamping jaw carriage. In this way, the at least four clamping jaw carriages may be moved at the guides independently of one another so that the clamping jaws may be tilted arbitrarily open and closed, whereby the two jaws tilt independently of one another.

The example of disposing a dedicated drive on each clamping jaw carriage does, however, come with greater expenses, and higher cabling and control requirements. In one or more embodiments of the controller, the clamping jaw guide apparatus includes at least two drive elements coupled to a drive unit. Here, a first drive element is connected to the first clamping jaw carriage and a second drive element is connected to the second clamping jaw carriage so that the first and the second drive elements are disposed at a distance from one another in the first horizontal direction (x). Thus, the clamping jaw carriages associated with a guide may be moved or driven through the use of a single drive element, thereby obviating the need for assigning a single drive to each clamping jaw carriage. The drive elements and the associated drive unit may be disposed in any way as long as linear motion of the clamping jaw carriages is assured in the second horizontal direction at or on the guides. To drive or move the clamping jaw carriages, any kind of linear drive can be used. For example, the drive elements may be belt-driven, the belts being redirected at pulleys at the guides and driving the clamping jaw carriages (e.g., by way of a coupling to the drive unit). In such an example, the clamping jaw carriages are designed to include appropriate coupling to the drive unit.

In order to achieve separate controllability of all clamping jaw carriages, in one or more embodiments of the controller the clamping jaw guide apparatus includes at least four drive elements coupled to a drive unit. Here, two first drive elements are connected to the first clamping jaw carriage and two second drive elements are connected to the second clamping jaw carriage, wherein the first and the second drive elements are disposed at a distance from one another in the first horizontal direction (x). Thus, only one (central) drive unit is provided, which is coupled to the clamping jaw carriages by way of the drive elements and which moves the clamping jaw carriages by way of the drive elements at the guides. The drive unit itself may include only one drive, which may then be coupled to the drive elements by way of a corresponding transmission unit in order to move the elements individually and/or in pairs.

The drive elements and the associated drive unit may be disposed in any way as long as linear motion of the clamping jaw carriages is assured in the second horizontal direction (y) at or on the guides. Thus, to drive or move the clamping jaw carriages, any kind of linear drive may be used. In one or more embodiments, the drive elements are designed as toothed racks and coupled to the drive unit accordingly. Another advantage of the toothed racks is that high forces can be transferred to the clamping jaw carriages thereby.

To retrieve piece goods or medicinal packages from storage areas, it is common to align the clamping jaws in parallel and then move the same into the storage area so that after the clamping jaws are moved inward the piece goods to be retrieved are positioned therebetween. In order to grasp the piece goods, the clamping jaws are then tilted in such a way that the ends of the clamping jaws moved into the storage areas are moved toward one another. During retrieval, the ends of the clamping jaws may abut against the sides of the piece goods, or the clamping jaws may be moved together far enough that the distance between the ends of the clamping jaws is less than the width of the rear piece good to be retrieved.

Due to the manner in which the piece goods are retrieved, the clamping jaws don't need to be moved away from one another separately. Here, a synchronous, mirror-imaged, identical motion of the clamping jaws is sufficient. Therefore, in one or more embodiments, the drive unit includes at least two drives, each having one drive gear, and the first and second drive elements designed as toothed racks are disposed opposite one another. Thus, one drive gear is disposed centrally between the first and second drive elements, respectively, so that the clamping jaw carriages associated with a guide are driven synchronously.

As discussed above, the clamping jaws move inward into the storage area in order to retrieve piece goods or medicinal packages. Since the clamping jaws are coupled to the clamping jaw guide apparatus, the apparatus is movable in the storage and retrieval direction (e.g., corresponding to the first horizontal direction (x)), which is why the clamping jaw guide apparatus is coupled to a corresponding drive unit.

In order to provide a controller with as large of an open delivery table area as possible (e.g., with as compact a clamping jaw guide apparatus as possible), in one or more embodiments a component of the frame structure of the clamping jaw guide apparatus reaches around the delivery table and is coupled to a drive unit disposed below the delivery table, the drive unit moving the clamping jaw guide apparatus. In such an embodiment of the clamping jaw guide apparatus, it is possible to dispose the drive for moving the clamping jaw guide apparatus in the storage and retrieval direction below the delivery table such that the clamping jaw guide apparatus is designed very compactly relative to the first horizontal direction (x).

In one or more embodiments, the drive unit for moving the clamping jaw guide apparatus is designed as a linear drive with moving parts and stationary parts. Here, the moving parts are coupled to the component of the frame structure that reaches around the delivery table and the stationary parts are designed below the delivery table.

To move piece goods or medicinal packages placed on the delivery table from the same to a storage area, the controller may include a pusher (e.g., a telescope arm), wherein the pusher may be coupled to the clamping jaw guide apparatus or may be designed as a component of the clamping jaw guide apparatus.

In order to keep the design of the clamping jaw guide apparatus as simple as possible, one or more embodiments provide that the delivery table has an opening extending in the first horizontal direction, a pusher being movable in the opening in the first horizontal direction, wherein the pusher is coupled to a drive. The mechanism for moving the pusher is therefore disposed primarily below the delivery table so that the number of components of the clamping jaw guide apparatus is reduced.

In order to avoid slippage of clamping jaws against piece goods as they are retrieved, in one or more embodiments at least one section of the clamping surfaces of the clamping jaws includes a non-slip material. For example, either the jaw is made of such a non-slip material or the jaw is coated, at least in sections, with a non-slip material.

Figure 1B:
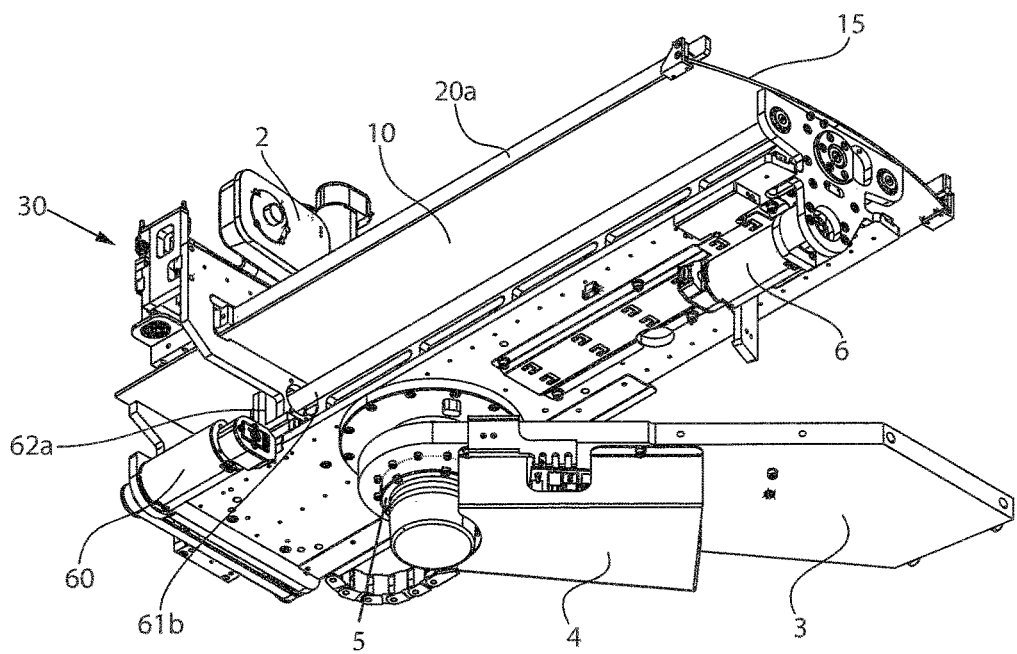

FIGS. 1a, 1b show two perspective views of one or more embodiments of the controller, wherein FIG. 1a reflects a perspective view from above and FIG. 1b reflects a perspective view from below. The controller 1 includes a delivery table 10, above which two clamping jaws 20a, 20b having opposing clamping surfaces 21a, 21b are disposed. The free ends of the clamping jaws 20a, 20b may have a section 22a, 22b that is coated with a non-slip material.

At the free ends of the clamping jaws 20a, 20b, the delivery table 10 has a storage and retrieval side 15 past which medicinal packages are pushed from the delivery table 10 onto storage areas or pulled from the storage areas onto the delivery table 10. The storage and retrieval direction corresponds to the first horizontal direction x indicated in FIG. 1a.

The delivery table 10 has a central slotted opening 11 that extends in the storage and retrieval direction (e.g., in the first horizontal direction x). A pusher element 12 with a broadened pushing head 13 is disposed in the opening 11. The pusher element 12 may be moved in the slotted opening 11 in the storage and retrieval direction (e.g., in the first horizontal direction x).

A clamping jaw guide apparatus 30 is disposed opposite to the storage and retrieval side 15, with clamping jaws 20a, 20b being connected to the clamping jaw guide apparatus 30. The clamping jaw guide apparatus 30 may include the mechanism for tilting the clamping jaws 20a, 20b. In the upper section, the clamping jaw guide apparatus 30 includes a clamping jaw drive unit 50 with first and second drives 51, 52, as well as associated first and second transmissions 53, 54. As shown, the first and second drives 51, 52 cause the clamping jaws 20a, 20b to tilt in a manner described in detail in the subsequent figures. The clamping jaw guide apparatus 30 may also include an optical detector 2 for monitoring various aspects of the storage and retrieval process.

The clamping jaw guide apparatus 30 and all the electronic components thereof are connected to a control unit 4 that is disposed below a fastening arm 3 as shown. The fastening arm 3 may be fastened to the delivery table 10 or to a substructure thereof by way of a swivel joint 5.

To store and retrieve medicinal packages, the clamping jaw guide apparatus 30 is moved in the first horizontal direction x (e.g., the storage and retrieval direction). To this end, a guide apparatus drive unit 60 may be disposed below the delivery table 10, the guide apparatus drive unit 60 moving the clamping jaw guide apparatus 30 as described in the subsequent figures in detail. Further disposed below the delivery table 10 may be a pusher drive unit 6 for moving the pusher element 12 in the first horizontal direction x in the slotted opening 11.

Figure 2A:
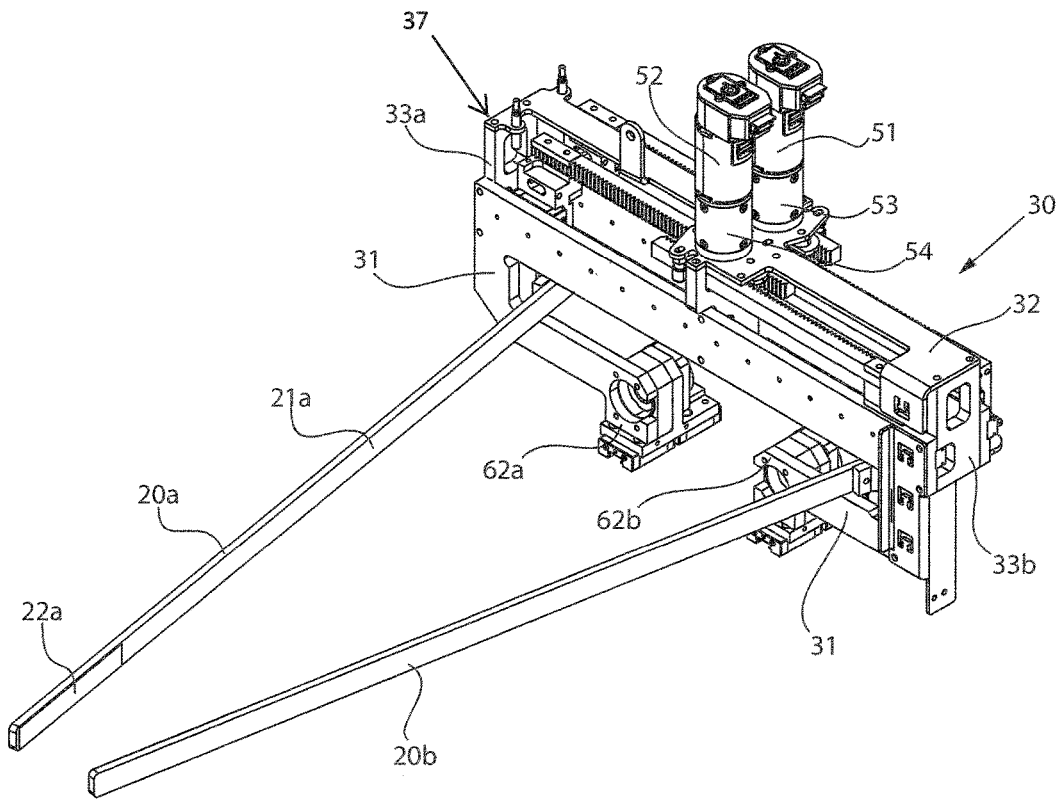
FIG. 2a is a top perspective view of an embodiment of a clamping jaw guide apparatus.
Figure 2B:
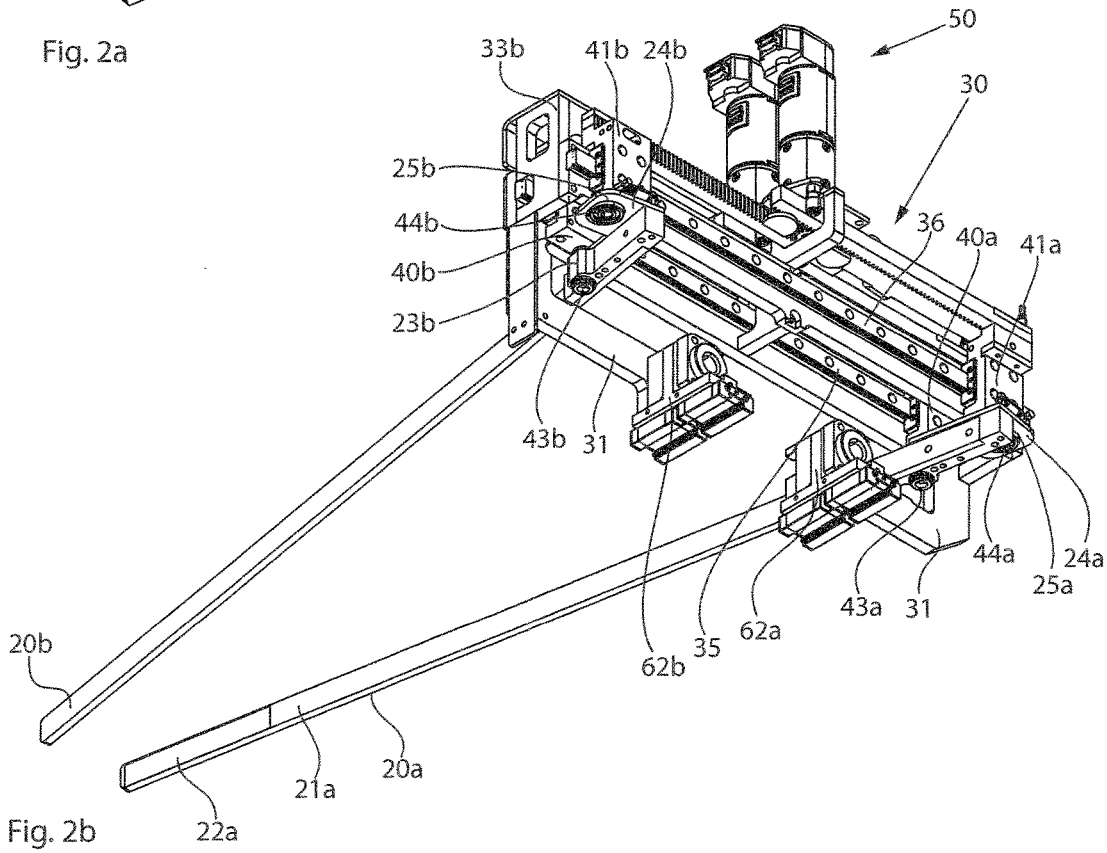

FIGS. 2a and 2b are perspective views of the clamping jaw guide apparatus 30 together with the clamping jaws 20a, 20b. The clamping jaw guide apparatus 30 includes a frame structure 37, the frame structure 37 having a front component 31, a top component 32, and opposing lateral components 33a, 33b. The front component 31 may be configured to reach around the clamping jaws 20a, 20b and the delivery table 10 (see FIGS. 1a, 1b). Fastened at the lower ends of component 31 are moving parts 62a, 62b (e.g., the "runners") of a linear drive, the runners being able to move the clamping jaw guide apparatus 30 in the first horizontal direction. The components are called "moving" components since they move in the first horizontal direction together with the clamping jaw guide apparatus 30 along corresponding stationary parts, which are rotated so as to move the moving parts. The stationary parts 61a, 61b (see FIG. 1b) themselves may move in order to move the moving parts, for example by rotation of the stationary parts, whereby this rotational motion may move the moving parts along the longitudinal axis of the stationary parts. The stationary parts are therefore only themselves stationary relative to the positions thereof within the controller 1.

For example, the stationary parts may be provided as belts designed between the longitudinal ends of the controller 1 and that cooperate with corresponding pulleys for moving the moving parts.

Figure 3:
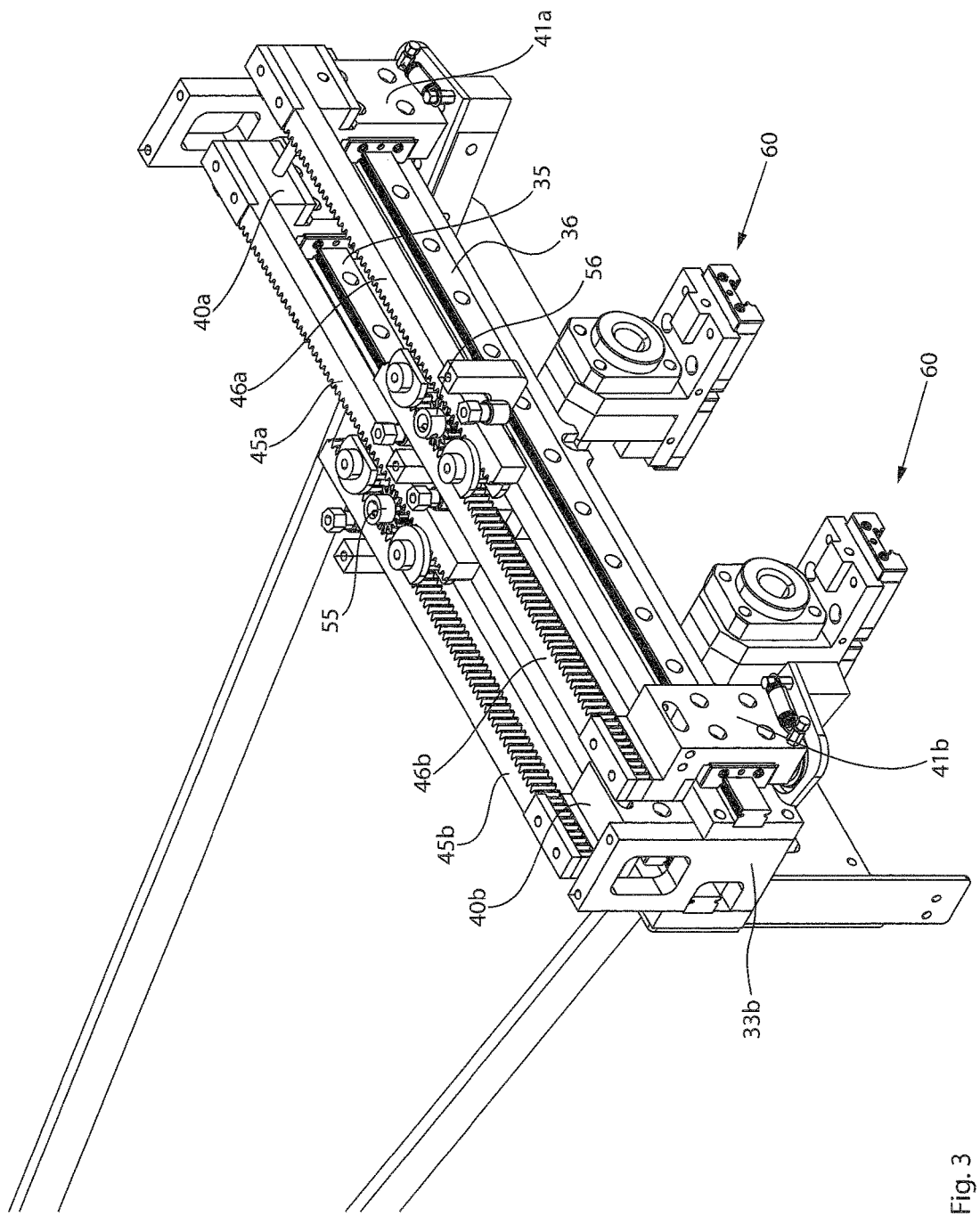

As can be seen in FIGS. 2b and 3, a first guide 35 and a second guide 36, extend parallel to one another between lateral components 33a, 33b in a second horizontal direction y. Here, the guides 35, 36 are separate from one another in the first horizontal direction x, wherein the first guide 35 faces the free ends of the clamping jaws 20a, 20b.

Clamping jaw carriages 40a, 40b; 41a, 41b are disposed at each of the guides 35, 36. Two first clamping jaw carriages 40a, 40b may be disposed at the first guide 35 and two second clamping jaw carriages 41a, 41b may be disposed at the second guide 36. A section of the clamping jaw carriages 40a, 40b; 41a, 41b may reach around a projecting end of the guides 35, 36 such that part of the clamping jaw carriages 40a, 40b; 41a, 41b sit on the projecting end.

In one or more embodiments, the guides 35, 36 and carriages 40a, 40b; 41a, 41b may be designed in slightly different ways. For example, the guides 35, 36 may be designed as simple tubes through which surrounding clamping jaw carriages 40a, 40b; 41a, 41b may be moved. The exact design of the guides 35, 36 and the clamping jaw carriages 40a, 40b; 41a, 41b is insignificant for the present disclosure. It is only important to ensure that the clamping jaws 20a, 20b may move parallel to one another and in the second horizontal direction y, which runs perpendicular and orthogonal to the first horizontal direction x.

As can be seen in FIG. 3 in particular, the clamping jaw carriages 40a, 40b; 41a, 41b are connected to drive elements 45a, 45b; 46a, 46b, which may be designed as toothed racks as shown. The drive elements 45a, 45b associated with the first guide 35 and the corresponding first clamping jaw carriages 40a, 40b, and the corresponding drive elements 46a, 46b associated with the second guide 36, may be aligned relative to the tooth elements of the racks in such a way that the tooth elements oppose one another and form an overlapping area at the free ends thereof. Disposed in the center of the overlapping area of the respective drive elements or racks 45a, 45b; 46a, 46b are first and second drive gears 55, 56 that are coupled to first and second drives 51, 52 by way of first and second transmissions 53, 54 (see FIG. 1).

The distance between the clamping jaw carriages 40a, 40b; 41a, 41b of a guide 35, 36 and the corresponding drive gear thereof may be identical. In other words, a drive gear may be disposed precisely in the center between two clamping jaw carriages 40a, 40b; 41a, 41b so that a movement of the drive gear causes synchronous movements of the clamping jaw carriages 40a, 40b; 41a, 41b. When the drive gear is rotated, the clamping jaw carriages 40a, 40b; 41a, 41b are moved synchronously toward or away from one another, wherein the same applies to the clamping jaw carriages 40a, 40b; 41a, 41b associated with the two guides 35, 36.

The clamping jaw carriages 40a, 40b of the first guide 35 may therefore be moved simultaneously or separately with respect to the clamping jaw carriages 41a, 41b of the second guide 36, providing a large degree of flexibility with regard to movement of the clamping jaw carriages 40a, 40b; 41a, 41b. The clamping jaw carriages 40a, 40b; 41a, 41b of the first and second guides 35, 36 may be moved synchronously or only the clamping jaw carriages 40a, 40b; 41a, 41b associated with either the first or the second guide 35, 36 may be moved. In this way, it is possible to move the clamping jaws 20a, 20b that are fastened to the clamping jaw carriages 40a, 40b; 41a, 41b, in parallel or already tilted, simultaneously without any change in angle (e.g., by simultaneously moving the clamping jaw carriages 40a, 40b; 41a, 41b of both guides 35, 36). If it is only the clamping jaw carriages 40a, 40b; 41a, 41b of one guide 35, 36 that are to be moved, it is possible to tilt the clamping jaws 20a, 20b.

In one or more embodiments, one drive element 45a, 45b; 46a, 46b is associated with each clamping jaw carriage 40a, 40b; 41a, 41b. In one or more embodiments, only two drive elements may be provided, wherein the two drive elements are associated with one guide and are designed as belts for driving the clamping jaw carriages 40a, 40b; 41a, 41b, for example. In one or more embodiments, pulleys may also be provided for the belts. The pulleys may be coupled to the guides 35, 36 or to the frame structure 37. Further, a coupling between the clamping jaw drive unit 50 and the drive elements/belts may be provided.

As explained above, clamping jaws 20a, 20b are coupled to the clamping jaw guide apparatus 30. This coupling can be seen in FIG. 2b. Here, clamping jaws 20a, 20b may be connected to clamping jaw carriages 40a, 40b by way of a respective swivel joint 23a, 43a; 23b, 43b of the first guide 35 and to clamping jaw carriages 41a, 41b of the second guide 36 by way of a slotted hole guide 24a, 25a, 44a; 24b, 25b, 44b. In one or more embodiments, the swivel joint may be disposed at the clamping jaw carriages 41a, 41b associated with the second guide 36. In this case, the slotted hole guides 24a, 25a, 44a; 24b, 25b, 44b may be disposed at the clamping jaw carriages 40a, 40b associated with the first guide 35.

However, it is not absolutely necessary to use the swivel joint/slotted hole guide combination. The clamping jaws 20a, 20b are held using a swivel or pivot joint at the corresponding clamping jaw carriages 40a, 40b; 41a, 41b of at least one guide, but use of a slotted hole guide is not absolutely required. Thus, for example, in one or more embodiments, the clamping jaws 20a, 20b may be moved together with the clamping jaw carriages 40a, 40b; 41a, 41b against a restoring force, and when the clamping jaw carriages 40a, 40b; 41a, 41b are moved back the restoring force moves the clamping jaws 20a, 20b back.

Figure 4A:
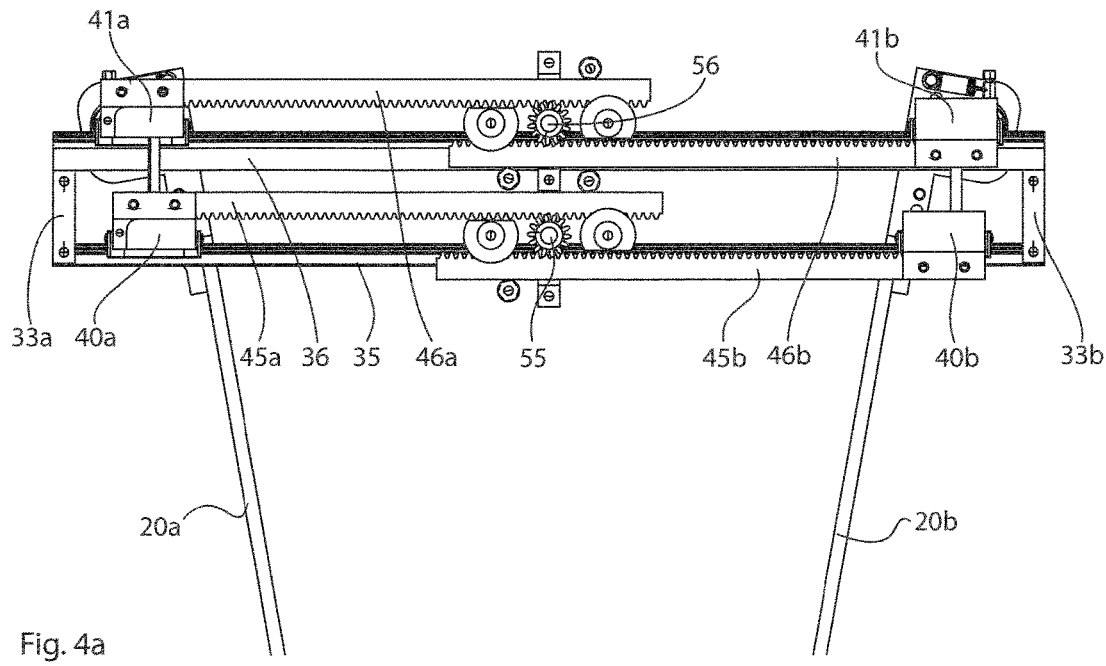
FIG. 4a is a top view of the clamping jaw guide apparatus of FIG. 3.
Figure 4B:
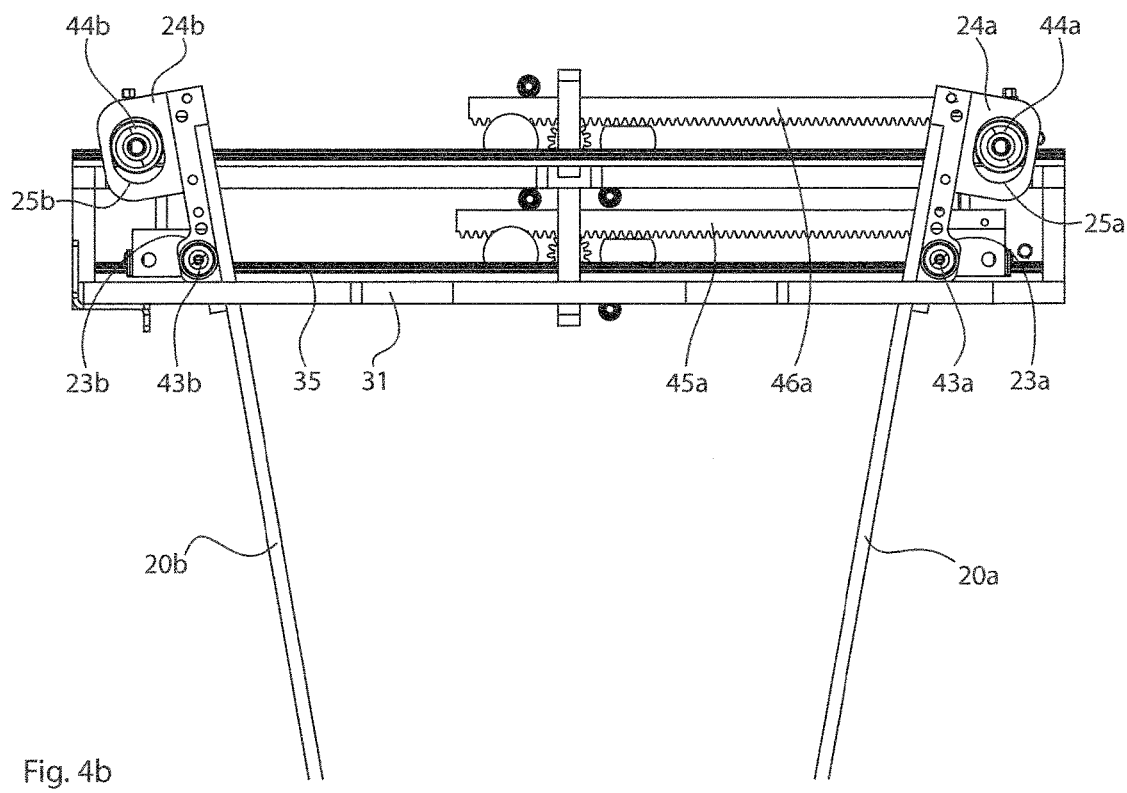
FIG. 4b is a bottom view of the clamping jaw guide apparatus of FIG. 3.

FIGS. 4a, 4b show a top view and bottom view of the clamping jaw guide apparatus 30 with the clamping jaws 20a, 20b tilted, wherein parts of the frame structure 37 and the clamping jaw drive unit 50 are left out. In FIG. 4a, it is easily seen that the first and second drive gears 55, 56 are disposed exactly in the center between corresponding clamping jaw carriages 40a, 40b; 41a, 41b so that a rotating motion of the first and second drive gears 55, 56 effects a synchronous movement of the associated clamping jaw carriages 40a, 40b; 41a, 41b.

FIG. 4b shows a detailed view of the swivel joints 23a, 43a; 23b, 43b and the slotted hole guides 24a, 25a, 44a; 24b, 25b, 44b. Pins or projections 43a, 43b, 44a, 44b of the swivel joints and slotted hole guides 24a, 25a, 44a; 24b, 25b, 44b are provided by the corresponding clamping jaw carriages 40a, 40b; 41a, 41b, whereas the corresponding receptacles are provided by the clamping jaws 20a, 20b or by components disposed thereon.

Figure 5:
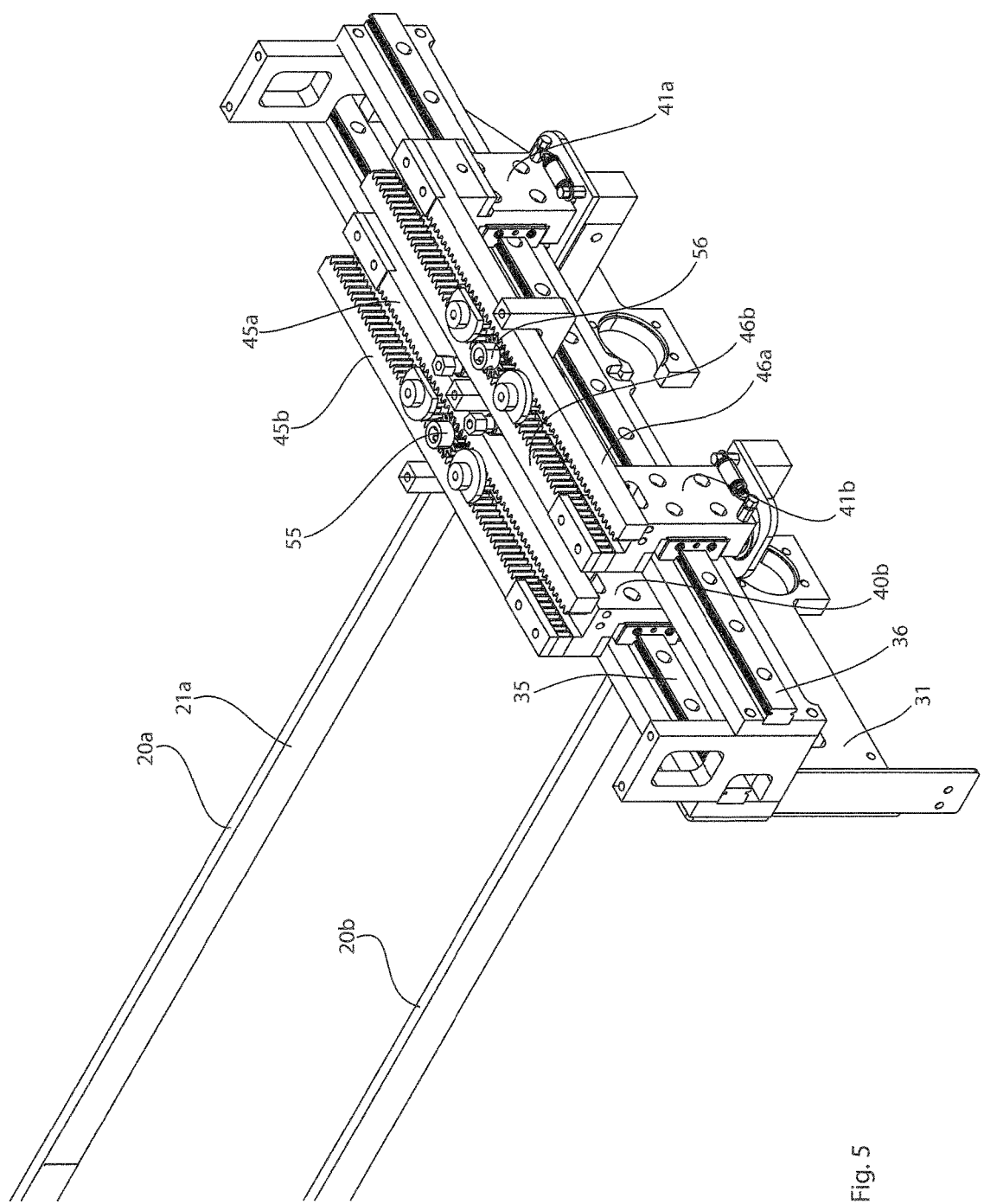
FIG. 5 is a perspective view of a portion of the clamping jaw guide apparatus of FIG. 2a in a clamped position.

FIG. 5 shows a detail view of the clamping jaw guide apparatus 30, wherein parts of the clamping jaw drive unit 50 and of the frame structure 37 are left out to provide a better view of the remaining components. In FIG. 5, clamping jaws 20a, 20b have been brought together and are aligned parallel with one another. In a comparison of FIGS. 3 and 5, it can be seen how the position of the clamping jaws 20a, 20b is influenced by a shift of the clamping jaw carriages 40a, 40b; 41a, 41b at the guides 35, 36.

Figure 6A:
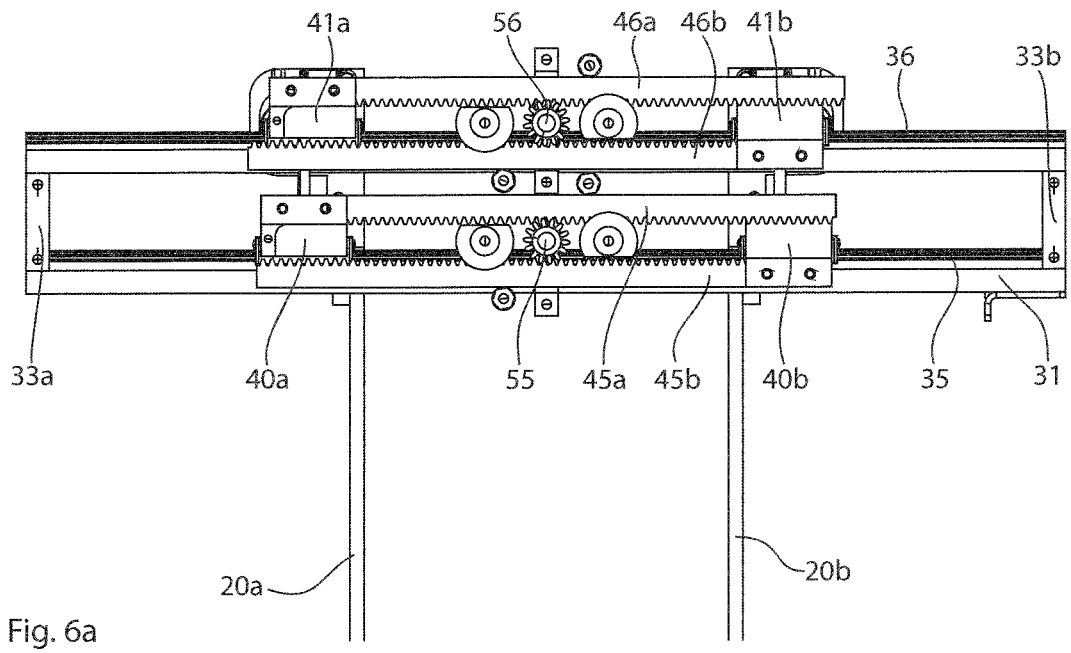
FIG. 6a is a top view of the clamping jaw guide apparatus of FIG. 5.
Figure 6B:
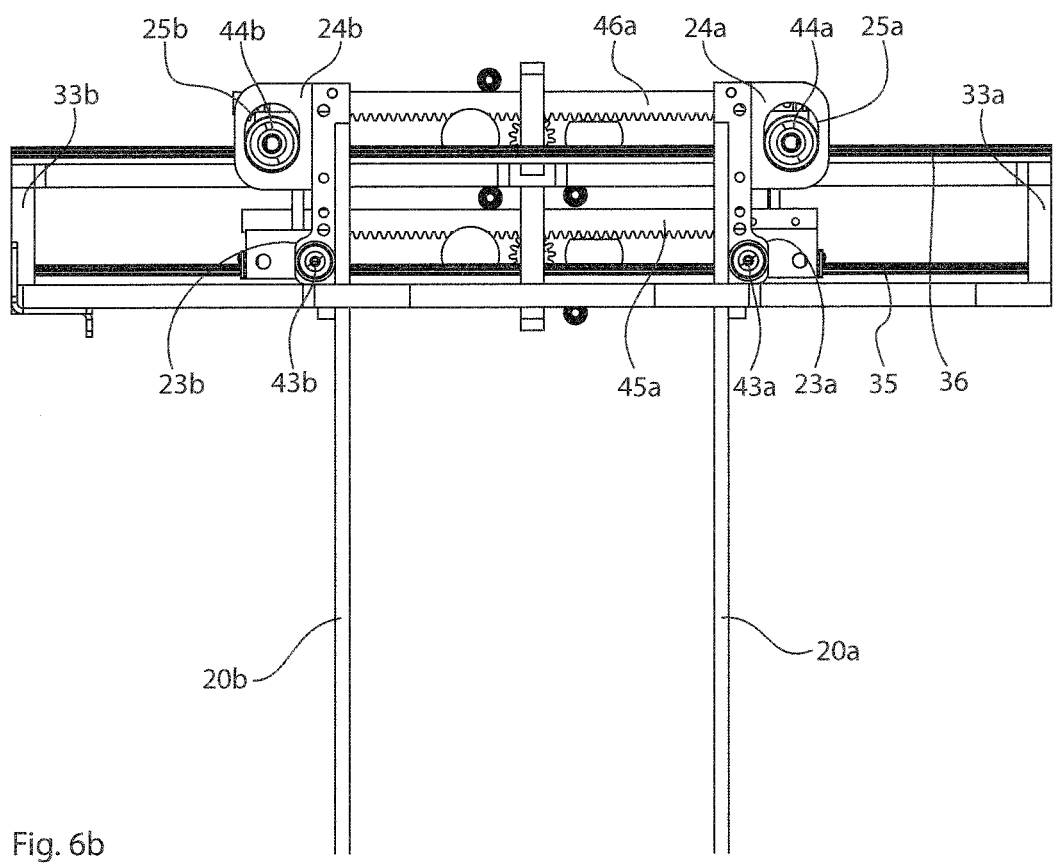
FIG. 6b is a bottom view of the clamping jaw guide apparatus of FIG. 5.

FIGS. 6a, 6b show a top view and a bottom view according to FIG. 5 (e.g., of a clamping jaw guide apparatus 30 with parallel clamping jaws 20a, 20b brought together). In FIG. 6b, it can be seen that the projections or pins 44a, 44b of the clamping jaw carriages 41a, 41b of guide 36 are disposed in slotted holes 25a, 25b entirely "at the bottom" since the clamping jaws 20a, 20b are situated parallel. Thereby, the section of the clamping jaws 20a, 20b located between the first and second guides 35, 36 is the smallest. When the clamping jaws 20a, 20b are tilted, whether inward or outward relative to the ends of the clamping jaws 20a, 20b, the section of the clamping jaws 20a, 20b (e.g., the length thereof) located between the guides 35, 36 increases such that the projections or pins 44a, 44b would travel "upward" within slotted holes 25a, 25b. In one or more embodiments, it may not be required for the "slotted hole" as such to be closed, but instead an open slotted hole (e.g., a type of fork) may also be used for guiding the pins or projections.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A controller for a commissioning device with horizontal storage surfaces for storing piece goods, comprising:

a delivery table extending in a first horizontal direction, the delivery table having a storage end and a retrieval end;

two elongated clamping jaws disposed above the delivery table and comprising clamping surfaces facing one another;

a clamping jaw guide apparatus, comprising:
  a frame structure;
  at least one first and one second guides that are parallel and apart from one another in the first horizontal direction and extend in a second horizontal direction, perpendicular to the first horizontal direction, and
  at least four clamping jaw carriages coupled to the guides and movable in the second horizontal direction, wherein two first clamping jaw carriages are associated with the first guide and two second clamping jaw carriages are associated with the second guide, respectively, wherein at least two clamping jaw carriages separated from one another in the first horizontal direction are coupled to a single clamping jaw, respectively; and a guide apparatus drive unit coupled to the clamping jaw guide apparatus, the guide apparatus drive unit configured to drive the clamping jaw guide apparatus in the first horizontal direction, wherein the four clamping jaw carriages are moveable in the second direction, wherein a first drive element is connected to the first clamping jaw carriages and a second drive element is connected to the second clamping jaw carriages, wherein the first and the second drive elements are disposed at a distance from one another in the first horizontal direction.

2. The controller of claim 1, wherein the clamping jaw guide apparatus comprises at least four drive elements coupled to the clamping jaw drive unit.

3. The controller of claim 2, wherein two first drive elements are connected to the first clamping jaw carriages and two second drive elements are connected to the second clamping jaw carriages, wherein the first and the second drive elements are disposed at a distance from one another in the first horizontal direction.

4. The controller of claim 1, wherein the drive elements are toothed racks.

5. The controller of claim 4, wherein the clamping jaw drive unit comprises at least two drives which have one drive gear each, disposed opposite to the first and second drive elements, respectively, wherein a respective drive gear is disposed in the center between the first and second drive elements that the respective clamping jaw carriages associated with a guide are configured to be driven synchronously.

6. The controller of claim 1, wherein a component of the frame structure reaches around the delivery table and is coupled to the guide apparatus drive unit for moving the clamping jaw guide apparatus, the guide apparatus drive unit being disposed below the delivery table.

7. The controller of claim 1, wherein the guide apparatus drive unit for moving the clamping jaw guide apparatus is configured as a linear drive with moving parts and stationary parts.

8. The controller of claim 1, wherein the delivery table comprises an opening that extends in the first horizontal direction, a pusher being moveably disposed in the opening in the first horizontal direction, wherein the pusher is coupled to a pusher drive unit.

9. The controller of claim 1, wherein at least one section of the clamping surfaces of the clamping jaws comprises a non-slip material.

10. A controller, comprising:
a delivery table;
a plurality of elongated clamping jaws disposed above the delivery table;
a clamping jaw guide apparatus, comprising:
  a frame structure;
  a plurality of guides disposed in parallel with the frame structure; and
  a plurality of clamping jaw carriages coupled to the plurality of guides, the plurality of clamping jaw carriages configured to be driven in parallel with the frame structure,
  wherein each of the plurality of guides is associated with one or more of the plurality of clamping jaw carriages,
  and wherein at least two of the plurality of clamping jaw carriages are coupled to each of the plurality of clamping jaws, wherein a first drive element is connected to first clamping jaw carriages and a second drive element is connected to second clamping jaw carriages, wherein the first and the second drive elements are disposed at a distance from one another in a direction along the delivery table; and
a guide apparatus drive unit coupled to the clamping jaw guide apparatus, the drive unit configured to drive the clamping jaw guide apparatus along the delivery table.

11. The controller of claim 10, wherein the clamping jaw guide apparatus comprises a plurality of drive elements coupled to a clamping jaw drive unit.

12. The controller of claim 10, wherein the clamping jaw guide apparatus comprises at least four drive elements coupled to the clamping jaw drive unit, wherein two first drive elements are connected to first clamping jaw carriages of the plurality of clamping jaw carriages and two second drive elements are connected to second clamping jaw carriages of the plurality of clamping jaw carriages, wherein the first and the second drive elements are disposed at a distance from one another.

13. The controller of claim 11, wherein the drive elements are toothed racks.

14. The controller of claim 13, wherein the clamping jaw drive unit comprises at least two drives which have one drive gear each, and that are disposed opposite to the first and second drive elements, respectively, wherein a respective drive gear is disposed in the center between the first and second drive elements that the respective clamping jaw carriages associated with a guide are configured to be driven synchronously.

15. The controller of claim 10, wherein a component of the frame structure is disposed around the delivery table and is coupled to the guide apparatus drive unit that is disposed below the delivery table, the guide apparatus drive unit configured as a linear drive with moving parts and stationary parts, wherein the guide apparatus drive unit is configured to move the clamping jaw guide apparatus.

16. The controller of claim 10, wherein the delivery table comprises an opening extending along a portion of the delivery table, a pusher being moveably disposed in the opening in the first horizontal direction, wherein the pusher is coupled to a pusher drive unit.

17. A commissioning device controller, comprising:
a delivery table elongated in a first direction;
two clamping jaws disposed above the delivery table;
a guide apparatus drive unit; and
a clamping jaw guide apparatus coupled to the guide apparatus drive unit, wherein the guide apparatus drive unit is configured to drive the clamping jaw guide apparatus in the first direction, wherein the clamping jaw guide apparatus comprises:
- a frame structure;
- first and second guides disposed in parallel and apart from one another along the first direction, and extending in a second direction perpendicular to the first direction; and
- a plurality of clamping jaw carriages coupled to the first and second guides and configured to be moveable in the second direction,
- wherein first clamping jaw carriages are associated with the first guide and second clamping jaw carriages are associated with the second guide,
- wherein at least two of the plurality of clamping jaw carriages are coupled to one of the clamping jaws and are separated from one another in the first direction,
- and wherein a first drive element is connected to the first clamping jaw carriages and a second drive element is connected to the second clamping jaw carriages, wherein the first and the second drive elements are disposed at a distance from one another in the first direction.

\* \* \* \* \*